(12) United States Patent
Häfner

(10) Patent No.: US 12,255,494 B2
(45) Date of Patent: Mar. 18, 2025

(54) ELECTRIC MOTOR WITH A STATOR AND AN AXLE THAT CAN BE PRESS-FITTED THERETO

(71) Applicant: EBM-PAPST MULFINGEN GMBH & CO. KG, Mulfingen (DE)

(72) Inventor: Jochen Häfner, Blaufelden (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 230 days.

(21) Appl. No.: 17/881,717

(22) Filed: Aug. 5, 2022

(65) Prior Publication Data

US 2023/0039417 A1    Feb. 9, 2023

(30) Foreign Application Priority Data

Aug. 9, 2021    (DE) ...................... 10 2021 120 676.6

(51) Int. Cl.
*H02K 1/18* (2006.01)
(52) U.S. Cl.
CPC .................................. *H02K 1/187* (2013.01)
(58) Field of Classification Search
CPC ................................ H02K 1/187; H02K 1/18
See application file for complete search history.

(56) References Cited

U.S. PATENT DOCUMENTS

| | | | |
|---|---|---|---|
| 4,934,042 | A | 6/1990 | Bush |
| 2013/0293057 | A1 | 11/2013 | Naito et al. |
| 2021/0006103 | A1 | 1/2021 | Cho et al. |

FOREIGN PATENT DOCUMENTS

| | | |
|---|---|---|
| DE | 19939528 A1 | 2/2001 |
| DE | 102009023080 A1 | 12/2010 |
| DE | 102017103107 A1 | 9/2017 |
| JP | 2010-93960 A | 4/2010 |
| JP | 2014230424 A | 12/2014 |
| WO | WO-2021123539 A1 | 6/2021 |

OTHER PUBLICATIONS

English translation of JP-2014-230424-A (Year: 2014).*
GPTO Search Report issued in corresponding German Patent Application No. 10 2021 120 676.6 on May 2, 2022.

* cited by examiner

*Primary Examiner* — Tulsidas C Patel
*Assistant Examiner* — Joshua Kiel M Rodriguez
(74) *Attorney, Agent, or Firm* — Harness, Dickey & Pierce, P.L.C.

(57) ABSTRACT

An electric motor with a stator and an axle (20). The stator has a laminated stator core (10) formed from a multitude of individual teeth (11). At least some of the individual teeth (11) each have a radially inner pressing portion (13) for elastic and/or plastic deformation and establishment of a press-fit connection between the laminated stator core (10) and the axle (20). The stator is fixed to the axle (20) through the deformation of the pressing portions (13) and a force acting on the axle (20). At least one securing element (30) is on at least some of the pressing portions (13) to transmit a torque between the axle (20) and the laminated stator core (10) and fix the position of the laminated stator core (10) relative to the axle (20) in the circumferential direction (U).

7 Claims, 3 Drawing Sheets

ELECTRIC MOTOR WITH A STATOR AND AN AXLE THAT CAN BE PRESS-FITTED THERETO

CROSS-REFERENCE TO RELATED APPLICATION

This claims the benefit and priority of German Application No. 102021120676.6, filed Aug. 9, 2021. The entire disclosure(s) of (each of) the above application(s) is (are) incorporated herein by reference.

FIELD

The present disclosure relates to an electric motor with a stator and an axle that can be interconnected in a torque-proof manner by a press-fit connection and a securing element.

BACKGROUND

Diverse variants of a stator are already known from the prior art. For example, when the electric motor is embodied as an external rotor motor, it must be joined to an axle.

If the stator is to be connected to the axle, in a torque-proof manner, the common practice is to secure the stator or individual teeth of a segmented stator against twisting using a feather key, spline shaft, or dovetail joint.

The problem here, however, is that a portion of the stator or of the individual teeth of the stator adjoining the axle must be manufactured with high precision to correspond to the outer contour of the axle. Thus, the stator or the individual teeth are fixed, on the one hand, around the axle in the circumferential direction and, on the other hand, to the axle in the radial direction to the axis of rotation of the electric motor.

Accordingly, a double fit and the associated high level of effort and cost is usually involved.

SUMMARY

This section provides a general summary of the disclosure, and is not a comprehensive disclosure of its full scope or all of its features.

It is therefore an object of the disclosure to overcome the aforementioned drawbacks by providing an electric motor where the stator can be joined in a simple manner to an axle passing through it and fixed to the axle both in a circumferential direction and in a radial direction.

This object is achieved by an electric motor, preferably in the form of an external rotor motor, that comprises a stator and an axle. Alternatively, the axle can also be described as an axle element. The stator has a laminated stator core that is formed from a multitude of individual teeth that can be arranged in a ring around an axis of rotation of the electric motor and are interconnected in the circumferential direction. Thus, the stator or the laminated stator core is segmented into the individual teeth and can be described as a segmented stator. Preferably, each individual tooth of the plurality of individual teeth is flanked on both sides along the circumferential direction around the axis of rotation by a further individual tooth from among the plurality of individual teeth. It has a connection portion to mechanically fix the individual tooth to the two individual teeth by which it is flanked. If the electric motor is embodied as an external rotor motor, so that the stator is connected to an axle that is on the inside across from the stator, an external rotor of the electric motor can rotate about the axle and the stator. At least some of the individual teeth and, preferably, all of the individual teeth each have a radially inner pressing portion for elastic and/or plastic deformation and establishment of a press-fit connection between the laminated stator core and the axle. The axle can extend through the laminated stator core along the axis of rotation and coaxially with the axis of rotation. Thus, upon joining of the stator to the axle, the stator can be fixed to the axle through the deformation of the pressing portions and a force acting on the axle as a result of the deformation between laminated stator core and axle. Furthermore, the electric motor also has at least one securing element. The securing element is provided on at least some of the pressing portions and is designed to transmit a torque between the axle and the laminated stator core and to fix the position of the laminated stator core relative to the axle in the circumferential direction.

The securing element can extend from the respective individual tooth or from the respective pressing portion into the axle.

A plurality of securing elements are preferably distributed uniformly around the axis of rotation in the circumferential direction and are arranged, for example, on every other pressing portion.

Furthermore, the number of securing elements is or is preferably chosen such that a maximum permissible torque can be transmitted by the securing elements between the stator and the axle.

The pressing portion is preferably designed to be elastically and/or plastically deformed when it is joined to the axle itself, with the forces occurring and acting on the individual tooth, preferably not affecting the other portions of the individual tooth and, in particular, the connection portion and the connection between the individual teeth in general, or only up to a permissible limit value.

One advantageous design variant of the electric motor includes at least the pressing portions, where a securing element is provided, each have a first groove. The first groove faces toward the axle and extends parallel to the axis of rotation and receives a respective securing element. Furthermore, all of the pressing portions can also have such a first groove. In this case, a respective securing element is inserted into all or only some of the pressing portions or some of the first grooves.

Furthermore, the axle has at least one second groove that faces toward the laminated stator core and extends parallel to the axis of rotation. In this case the securing element can be inserted in a form-fitting and/or frictional manner into a receiving space that is formed jointly by the at least one first groove and the at least one second groove. If a plurality of second grooves are provided, these are preferably distributed uniformly on the axle in the circumferential direction.

In order to minimize the machining of the axle and thus the costs involved, the number of securing elements corresponds to the number of the second grooves. Accordingly, no more second grooves need be provided than are necessary. In that case, a respective receiving space that receives a securing element is formed by each second groove with a respective first groove.

Furthermore, the at least one first groove is preferably designed to fix a respective securing element or respectively insertable securing element in the first groove in the radial direction. Thus, the securing element is fixed in the radial direction on the pressing portion. The first groove can be designed to correspond to the securing element. Thus, the groove encompasses the outer contour of the securing element to such an extent that it cannot move out of the first groove in the radial direction.

The securing element can be preferably inserted parallel to the axis of rotation. The securing element is also preferably a securing pin and more preferably cylindrical, for example in the form of a cylindrical pin or alignment pin.

The first grooves and the second grooves can each have a partially circular contour corresponding to a locking pin or generally corresponding to a cylindrical locking element. Furthermore, a first and a second groove can be added together to form a cylindrical receiving space that corresponds to the securing element.

If the locking pin is embodied as a cylindrical pin, for example, the first groove can encompass the cylindrical outer contour of the locking pin in a proportion of greater than 50%. This prevents it from moving out of the first groove in the radial direction.

As an alternative to a variant with a securing element that is embodied as a securing pin, the axle integrally forms the at least one securing element, faces toward the laminated stator core, and extends parallel to the axis of rotation. The securing element formed integrally by the axle can then be inserted in a form-fitting manner into a receiving space that is formed by the at least one first groove on the respective individual tooth. For example, the securing element can be a rectangular projection that protrudes from the axle in the radial direction and has side surfaces that are parallel to one another in the circumferential direction. The first groove can then form a receiving space that is also rectangular in terms of its contour and corresponds to the securing element. The side faces of the receiving space can be brought into contact with the side faces of the securing element in the circumferential direction. Thus, the individual teeth are fixed with the first groove in the radial direction, relative to the securing element by the press-fit connection, and in the circumferential direction by the securing elements.

As an alternative, the axle can also have at least one third groove that faces toward the laminated stator core and extends parallel to the axis of rotation. At least one individual tooth integrally forms the at least one securing element in its pressing portion such that it faces toward the axle and extends parallel to the axis of rotation. The securing element that is formed integrally by the individual tooth can be inserted in a form-fitting manner into a receiving space that is formed by the at least one third groove.

Also the securing element can be a rectangular projection having side surfaces that are parallel to one another. The third groove can form a receiving space that is also rectangular in terms of its contour and corresponds to the securing element. The side surfaces of the receiving space can be brought into contact with the side surfaces of the securing element. Thus, the individual teeth can be moved with their integrally formed securing element in the radial direction relative to the respective third groove or to the axle and are fixed in the circumferential direction. The mobility in the radial direction is then blocked or limited by the pressing portions or the press-fit connection.

Independently of the design of the securing element, the electric motor according to another advantageous variant can have the pressing portions each with a web that extends in the radial direction. Two lever arms are connected to the web and protrude oppositely to one another in the circumferential direction relative to the web. Each has a contact surface that points inward in the radial direction for contact with the axle. The two lever arms can each be deflected and deformed in the radial direction during the joining process.

Thus, a pressing force can be exerted on the axle as a result of the deflection and deformation, thus enabling the press-fit connection to be established.

Furthermore, together the lever arms define a sleeve-shaped pressing contour with their contact surfaces that is coaxial with the axis of rotation and oversized compared to an outer contour of the axle. Thus, the lever arms are or can be pressed radially outward when joined to the axle.

Accordingly, by virtue of the deformation of the pressing portions, the stator can be fixed to the axle by a press-fit connection.

A respective securing element is preferably provided between the two lever arms. If the first groove is provided for the securing element, it is preferably formed between the two lever arms and separates them from one another. If a securing element is formed integrally by an individual tooth or some of the individual teeth, then it is also preferably formed on the pressing portion between the lever arms, with a groove that decouples the respective lever arm from the securing element.

With such an elastic, plastic press-fit connection between the stator or laminated stator core and axle, a force acting on the individual teeth during joining in the region of the connection portions and separating the same from one another can be limited by local deformation that is restricted to the pressing portions. Thus, this prevents damage to the laminated stator core due to separation of the individual teeth. Furthermore, tolerance compensation is made possible solely by the pressing portions, more particularly, by the deformation of the pressing portions, resulting in fewer high manufacturing requirements for the axle. Accordingly, the axle can also be variable with regard to its respective pressing contour, so that no other laminated stator cores or individual teeth need to be manufactured within the region that can be compensated for by the pressing portions for different axles. Nor does the laminated stator core require cleaning in order to be joined to the axle, since contamination is compensated for by the press-fit connection or taken into account by the tolerance.

Since the lever arms are at least partially elastically deformed even with plastic deformation, they also act as springs. Thus, they can also be referred to as spring arms that exert a resilient force on the axle during or after joining.

Moreover, advantageously, the contact surfaces of the lever arms are concave. Due to their arrangement relative to one another, it is possible for both the contact surfaces of the lever arms to each be concave and for the contact surfaces of the lever arms of a pressing portion to be concave.

The web can extend from the pressing portion to the connection portion of the respective individual tooth.

Preferably, the lever arms are each connected to the web via a connection portion that is instantiated particularly as a taper. Thus, a force acting during joining can be predetermined. For example, the necessary and/or maximum force for deflecting the respective lever arm can be determined by a thickness or general geometric configuration of the connection portion. Thus, a force can be set in a targeted manner that is required to move the lever arm from a basic position before joining with the axle to move into a pressing position after joining with the axle.

Furthermore, the lever arms preferably have a free end on a side opposite the respective connection portion. Thus, they can be resiliently or elastically held by the connection portion on the web and plastically deformed or deflected in the radial direction at the end of an elastic region.

In order to further protect the stator from unwanted disassembly when it is joined to the axle, i.e., separation of the individual teeth or breaking of the mechanical connection produced by the connection portions, an advantageous further development has the pressing portions embodied such that, due to the deformation of the pressing portions, a force acting on the connection portions and separating the individual teeth from one another is smaller during joining than a maximum permissible force on the connection portions. Thus, the individual teeth do not separate during joining. This enables the force to be adjusted, for example through appropriate designing of the pressing portions or, for example, of the connection portions.

In order to enable simple centering to be performed during joining, when pressing the axle into the laminated stator core, insertion bevels that guide the axle into the laminated stator core along the axis of rotation can be provided on the pressing portions and particularly on the lever arms.

Alternatively, such insertion bevels can also be provided on the axle.

In order to further enable simple joining or insertion of the securing elements, a chamfer or insertion bevel can be provided, for example, on the first groove and/or second groove and/or third groove and/or on the securing element itself.

Furthermore, an axle with at least one second groove can also have a stop or a plurality of stops against which the securing element can be brought into contact when it is pushed in parallel to the axis of rotation. Thus, the stops limit the mobility of the securing elements parallel to the axis of rotation.

The features disclosed above can be combined as required, provided this is technically possible and they do not contradict one another.

If an alignment of the components is specified, such as the arrangement of the slots on a side facing toward the laminated stator core or the axle, the alignment refers to an assembled state where the laminated stator core and axle are joined together in the specified manner.

Further areas of applicability will become apparent from the description provided herein. The description and specific examples in this summary are intended for purposes of illustration only and are not intended to limit the scope of the present disclosure.

DRAWINGS

Other advantageous refinements of the disclosure are characterized in the subclaims and/or depicted in greater detail below together with the description of the preferred embodiment of the disclosure with reference to the figures. In the drawings:

The figures are schematic examples. Same reference symbols in the figures indicate same functional and/or structural features.

DETAILED DESCRIPTION

Example embodiments will now be described more fully with reference to the accompanying drawings.

Figure 1:
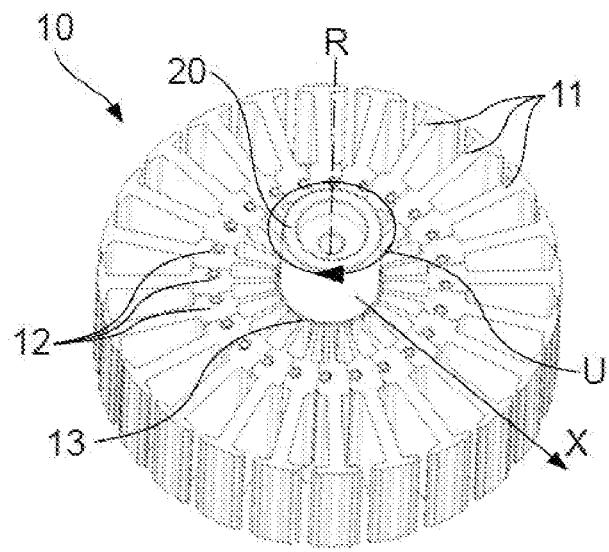
FIG. 1 is a perspective view of a laminated stator core that is joined to an axle.

FIG. 1 shows an electric motor perspective view of a laminated stator core 10 of an electric motor that is joined to an axle 20. If, as is the case here, a laminated stator core 10 is formed from a multitude of individual teeth 11 that are interconnected in the circumferential direction U, it is possible during joining of the laminated stator core 10 to the axle 20 for impermissibly high forces to occur in the region of the connection portions 12 where the individual teeth 11 are mechanically interconnected or fixed to one another in the circumferential direction U. This results in the release of the mechanical connection and separation of the individual teeth 11 from one another. This may dismantle or even damage the laminated stator core 10.

Figure 2:
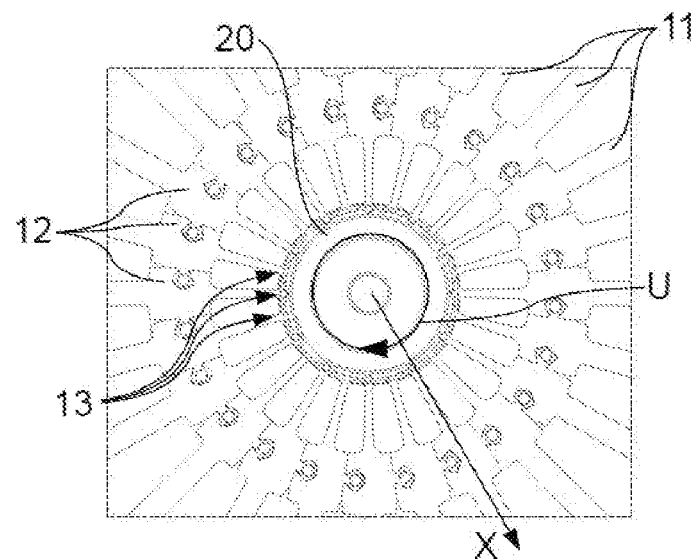
FIG. 2 is a plan view of a cut-out formed of laminated stator core that is joined to an axle.
Figure 3:
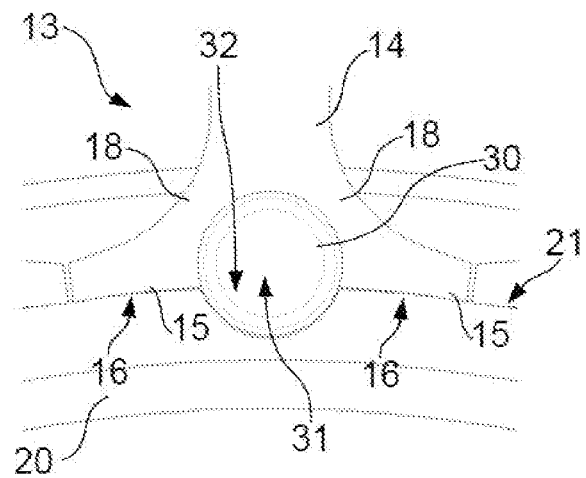
FIG. 3 is a detailed plan view of a pressing portion of an individual tooth of a laminated stator core that is joined to an axle.

In order to prevent such dismantling or damage to the laminated stator core 10, at least some of the individual teeth 11 and—especially preferably, as shown in FIGS. 1 to 3—all of the individual teeth 11 have a pressing portion 13. The pressing portion 13 is designed to join the laminated stator core 10 to the axle 20.

The pressing portion 13 is located radially to the axis of rotation R about which a rotor of the electric motor can rotate around the stator, on the inside, and closes off the individual teeth 11 in the radial direction X inward or toward the axle 20.

FIG. 2 corresponds to a detail of a plan view of the laminated stator core 10 with the axle 20 joined, as illustrated by FIG. 1. This makes it particularly clear that the laminated stator core 10 is in contact with the axle 20 exclusively through the pressing portions 13 of the individual teeth 11 of the laminated stator core 10. The pressing portions 13 of the individual teeth 11, together, define a sleeve-shaped pressing contour that corresponds to the outer contour of the axle 20 but is oversized relative thereto. Due to the oversize, the axle 20 can be arranged in and pressed into the pressing contour formed by the pressing portions 13. Thus, a deformation of the pressing portions 13 or a deformation of the lever arms 15 of the pressing portions 13, shown in FIG. 3, occurs during the pressing-in. The lever arms 15 are pressed radially outward and exert a pressing force on the axle 20.

Since a torque acts on the stator during operation of the electric motor, the stator or, more particularly, the laminated stator core 10 must be fixed around the axis of rotation R in the circumferential direction. According to the variant shown in FIGS. 1 to 4, second grooves 32 are included and distributed uniformly in the circumferential direction U on the axle 20. The second grooves 32 each correspond to the first grooves 31 on the pressing portions 13. Here, on all of the pressing portions 13, the first groove 31 of each second individual tooth 11 forms a receiving space with a respective second groove 32 to receive a securing element 30.

In the variant shown in FIGS. 1 to 4, the securing element 30 is a cylindrical securing pin that can be inserted parallel to the axis of rotation R into a receiving space that is formed by a first groove 31 and a second groove 32. The first groove 31 is designed so that it encompasses greater than 50% of the round outer contour of the securing element 30. Thus, the securing pin or the securing element 30 is held or fixed in the radial direction X by the first groove 31.

FIG. 3 shows an enlarged view of an individual pressing portion 13 with a securing element 30. This clarifies that the pressing portion 13 is terminated radially inward by two lever arms 15. The lever arms 15 are separated from one another by the first groove 31. Each lever arm 15 is connected to the web 14 by a taper or a connection portion 18.

The connection portions 18 and the groove 31 enable the lever arms 15 to deflect independently of one another. Each lever arm 15 has a free end opposite their end that merges into the connection portion 18. Thus, when they are joined to the axle 20, they initially yield elastically and can be plastically deformed preferably at the end of the elastic deformation.

The lever arms 15 each have a contact surface 16 to contact with the axle 20. Each of the contact surfaces 16 or the two contact surfaces 16 of the pressing portion 13, together, describing a concave shape or possibly being concave. The two contact surfaces 16 provide two contact regions or contact points for each pressing portion 13 via which the respective individual tooth 11 rests against the axle 20.

In order to prevent the individual teeth 11, that are interconnected at the connection portions 12, from being separated from one another when the axle 20 is joined, pressed into the stator or into the pressing contour formed by the pressing portions 13, the connection portions 18 are embodied such that, during joining and an associated deflection of the lever arms 15 at the connection portions 12, a force acts, which is smaller than a maximum permissible force, by which the individual teeth 11 at the connection portions 12 would be separated from one another.

Figure 4:
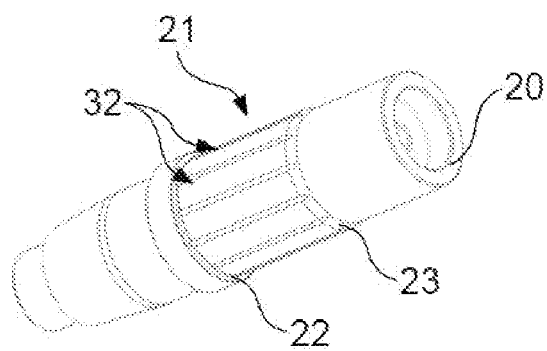
FIG. 4 is a perspective view of an axle.

FIG. 4 shows an axle 20 with second grooves 32 distributed in the circumferential direction U as can be employed in the variant shown in FIGS. 1 to 3. The axle 20 has a portion where the second grooves 32 extend and which determines the outer contour 21 that is relevant to the press-fit connection. Furthermore, the axle 20 forms a chamfer or insertion bevel 23 that centers the axle 20 in the laminated stator core 10 when it is pushed or pressed into the latter. The axle 20 has a contact surface 22 in order to limit the insertion or press-in depth of the securing elements 30 into the respective receiving spaces. The securing elements 30 come to rest on the contact surface 22 upon insertion.

Figure 5:
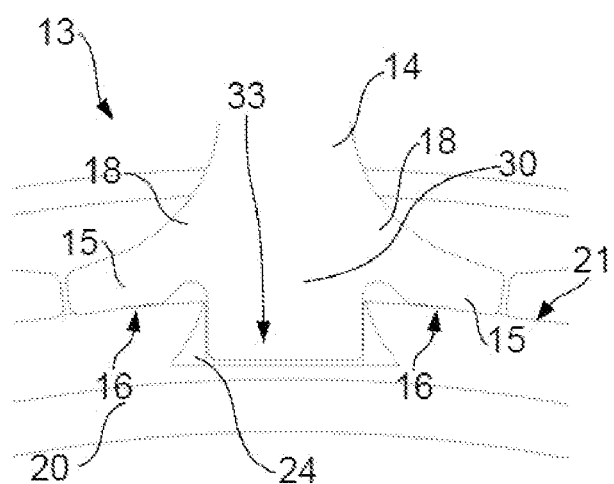
FIG. 5 is a detailed plan view of an alternative embodiment of a pressing portion of an individual tooth of a laminated stator core that is joined to an axle.

FIG. 5 depicts an alternative embodiment where at least some of the pressing portions 13 or at least some of the individual teeth 11 integrally form the securing element 30. The securing element 30 has a projection that protrudes in the radial direction X relative to the lever arms 15. The projection or the securing element 30 is flanked on both sides by a groove. The groove enables the lever arms 15 to be further deformed independently of one another and independently of the securing element 30 during joining of the laminated stator core 10 to the axle 20.

Each individual tooth 11 or, for example, every other individual tooth 11 can have such a securing element 30. In this case, the axle has a corresponding third groove 33 for each securing element 30.

Furthermore, the axle 20 can have additional insertion bevels 24 on the third grooves 33 in order to facilitate joining. Thus, the securing elements 30 are guided into the corresponding groove 33 during the joining process.

The disclosure is not limited in its execution to the abovementioned preferred exemplary embodiments. Rather, a number of variants are conceivable that make use of the illustrated solution even in the form of fundamentally different embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor with a stator and an axle, the stator has a laminated stator core formed from a multitude of individual teeth that can be arranged in a ring around an axis of rotation of the electric motor and are interconnected in the circumferential direction, at least some of the individual teeth each have a radially inner pressing portion for elastic and/or plastic deformation and establishment of a press-fit connection between the laminated stator core and the axle, the inner pressing portions extend through the laminated stator core along the axis of rotation and coaxially with the axis of rotation, upon joining of the stator to the axle, the stator can be fixed to the axle through the deformation of the pressing portions and a force acting on the axle as a result of the deformation between laminated stator core and axle, and the electric motor has at least one securing element, a respective securing element being provided on at least some of the pressing portions and designed to transmit a torque between the axle and the laminated stator core and to fix the position of the laminated stator core relative to the axle in the circumferential direction;

the pressing portions each have a web extending in the radial direction and two lever arms that are connected to the web and protrude oppositely to one another in the circumferential direction relative to the web, each lever arm has a contact surface that points inward in the radial direction for contact with the axle;

two lever arms can be deflected and deformed in the radial direction during the joining process so that a pressing force can be exerted on the axle as a result of the deflection and deformation; and a respective securing element is provided between the two lever arms.

2. The electric motor as set forth in claim 1, wherein at least the pressing portions, where a securing element is provided, each have a first groove that faces toward the axle and extends parallel to the axis of rotation and receives a respective securing element.

3. The electric motor as set forth in claim 2, wherein the axle has at least one second groove facing toward the laminated stator core and extends parallel to the axis of rotation, the securing element is inserted in a form-fitting and/or frictional manner into a receiving space that is formed jointly by the at least one first groove and the at least one second groove.

4. The electric motor as set forth in claim 3, wherein the axle has at least one third groove that faces toward the laminated stator core and extends parallel to the axis of rotation, at least one individual tooth integrally forms the at least one securing element in its pressing portion, faces toward the axle, and extends parallel to the axis of rotation, and the securing element that is formed integrally by the individual tooth can be inserted in a form-fitting manner into a receiving space that is formed by the at least one third groove.

5. The electric motor as set forth in claim 3, wherein the at least one first groove fixes a respective securing element in the first groove in the radial direction, so that the securing element is fixed in the radial direction on the pressing portion.

6. The electric motor as set forth claim 1, wherein the securing element is a securing pin.

7. The electric motor as set forth in claim 1, wherein the lever arms together define a sleeve-shaped pressing contour with their contact surfaces that is coaxial with the axis of rotation and oversized compared to an outer contour of the axle so that the lever arms are pressed radially outward when joined to the axle.

* * * * *